United States Patent [19]

Hillyer

[11] 4,013,151
[45] Mar. 22, 1977

[54] CLUTCH AND BACK PEDAL BRAKE
[75] Inventor: Anthony William Hillyer, Loughborough, England
[73] Assignee: Raleigh Industries Limited, Nottingham, England
[22] Filed: Feb. 11, 1975
[21] Appl. No.: 548,925

Related U.S. Application Data
[63] Continuation of Ser. No. 387,255, Aug. 10, 1973, abandoned, which is a continuation of Ser. No. 206,330, Dec. 9, 1971, abandoned.

[30] Foreign Application Priority Data
Dec. 8, 1970  United Kingdom ............ 58153/70

[52] U.S. Cl. ............................. 192/6 R; 192/110 B
[51] Int. Cl.² ................................ B60K 29/02
[58] Field of Search ....................... 192/6 R, 110 B
[56] References Cited
UNITED STATES PATENTS

| 773,333 | 10/1904 | Morrow | 192/6 R |
| 1,139,145 | 5/1915 | Deren | 192/6 R |
| 1,356,052 | 10/1920 | Duchesne | 192/6 R |
| 2,565,819 | 8/1951 | Hooykaas | 192/6 R |
| 3,010,553 | 11/1961 | Plas | 192/6 R |

FOREIGN PATENTS OR APPLICATIONS

| 356,566 | 7/1922 | Germany | 192/6 R |
| 49,181 | 12/1918 | Sweden | 192/6 R |
| 7,597 | 10/1905 | United Kingdom | 192/6 R |

Primary Examiner—Benjamin W. Wyche
Attorney, Agent, or Firm—Oblon, Fisher, Spivak, McClelland & Maier

[57] ABSTRACT

A back pedal brake hub having a clutch that is axially shiftable for selective engagement with a brake assembly to effect braking when the clutch is shifted in one direction or with a shell to transmit forward drive motion when the clutch is shifted in another direction with no axial loading of the ball races supporting the shell regardless of the direction in which the clutch is shifted. The engagement between the clutch and the shell is accomplished by means of mating teeth or dogs integrally connected with each of the clutch and the shell so as to provide positive form-locking engagement.

1 Claim, 9 Drawing Figures

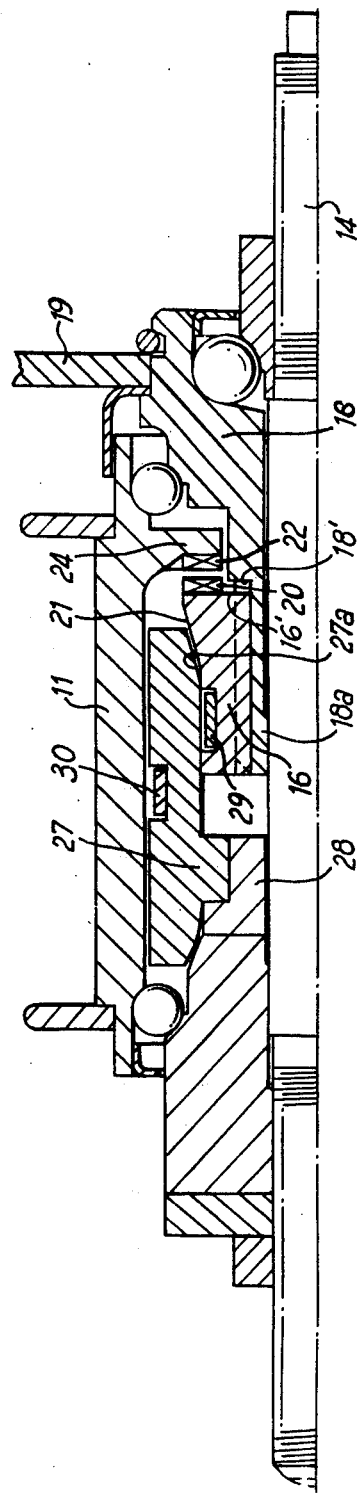

CLUTCH AND BACK PEDAL BRAKE

This is a continuation of application Ser. No. 387,255 filed Aug. 10, 1973 and now abandoned, which in turn is a continuation of Ser. No. 206,330 filed Dec. 9, 1971 and now abandoned.

The invention concerns back pedal brakes for bicycles and the like.

The object of the present invention is to provide a simple, yet efficient, back pedal brake arrangement for a single-speed hub wherein a positive form-locking drive engagement is provided between a clutch member and the shell of the hub for transmitting the driving motion.

According to the present invention a back-pedal brake hub for a bicycle or the like comprises a hub-spindle, a hub-shell arranged coaxially with the said spindle and rotatable thereabout, a driver supported by the spindle and extending in the axial direction of the hub, the said driver being adapted to transmit a drive motion to the hub, a brake assembly within the hub and adapted, upon actuation, to apply a braking action thereto, a clutch member arranged coaxially of the hub, the said clutch member being selectively cooperable with the brake assembly or with the hub according to the position of such member axially of the hub, and a displacement means sensitive to the direction of rotation of the driver and adapted according to such direction to shift the clutch member to a position whereat the said member cooperates with the brake assembly to effect brake engagement or to a position whereat the member transmits a drive to the hub shell in both instances without axial loading of the ball races supporting the shell.

The brake assembly may comprise a plurality of axially shiftable brake discs and brake pads arranged in interdigitated manner and which are caused to move into contact on brake actuation of the discs being mounted for rotation with the hub-shell and the brake pads being rotatably fixed relative to the hub spindle. Preferably, however, the brake assembly includes an expandable shoe arrangement which, upon brake actuation, moves radially outwardly into contact with the hub-shell.

The invention will now be described further, by way of example only, with reference to the accompanying drawings in which:

FIG. 5 is a diagrammatic longitudinal section taken through a second, and preferred, form of hub.

Figure 1:
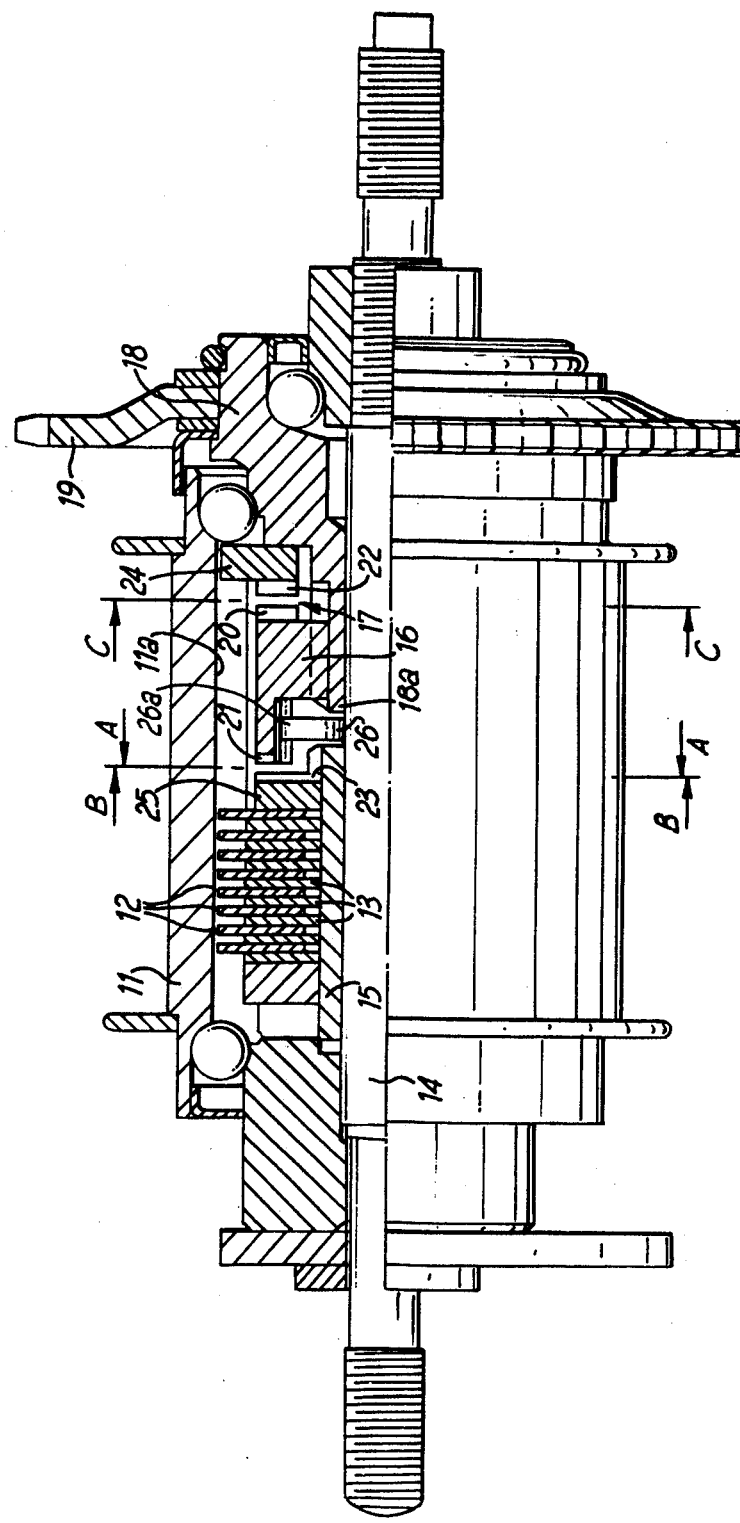
FIG. 1 is a longitudinal section taken through a first form of hub constructed in accordance with the present invention, the relative disposition of parts corresponding to a free-wheel condition of the hub.
Figure 1A:
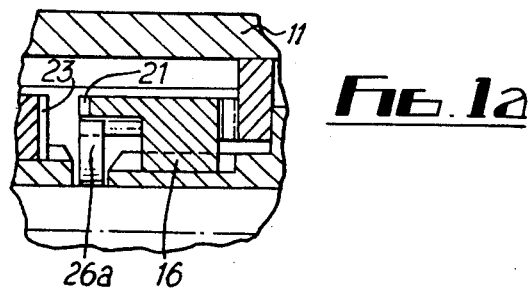
FIGS. 1a and 1b are fragmentary views, and show the clutch member of the hub of FIG. 1 in the forward drive and brake positions respectively.
Figure 1B:
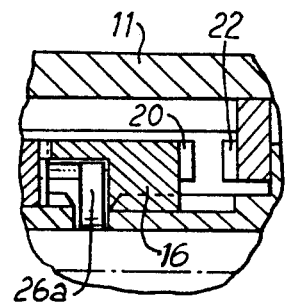
Figure 2:
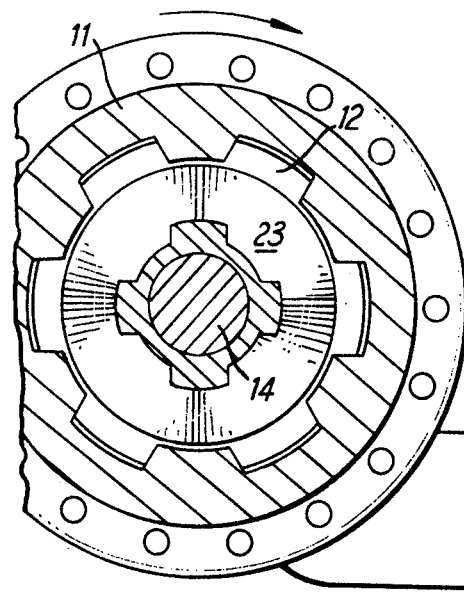
FIG. 2 is a section taken on line A—A of FIG. 1.
Figure 3A:
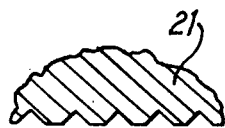
FIG. 3a is a fragmentary view and shows the profile of the serrations on the brake element of the hub of FIG. 1.
Figure 4A:
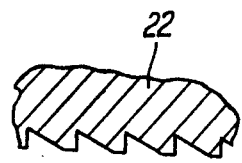
FIG. 4a is a fragmentary view of the profile of the serrations on a drive transmission plate.
Figure 3:
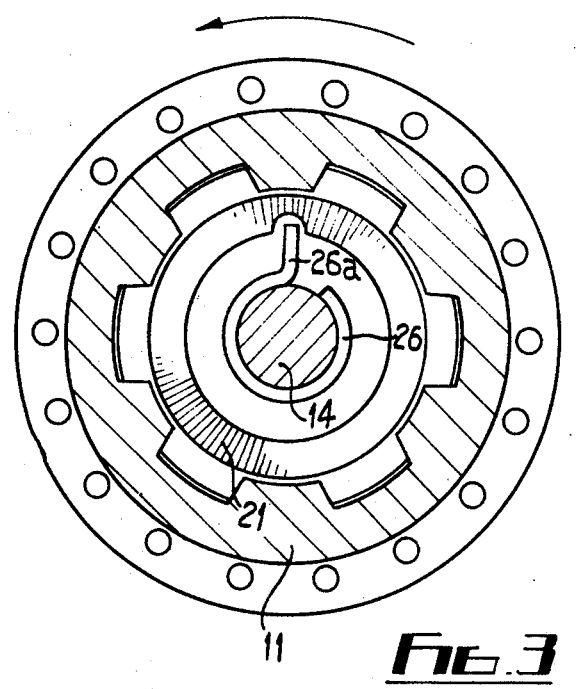
FIG. 3 is a section taken on line B—B of FIG. 1.
Figure 4:
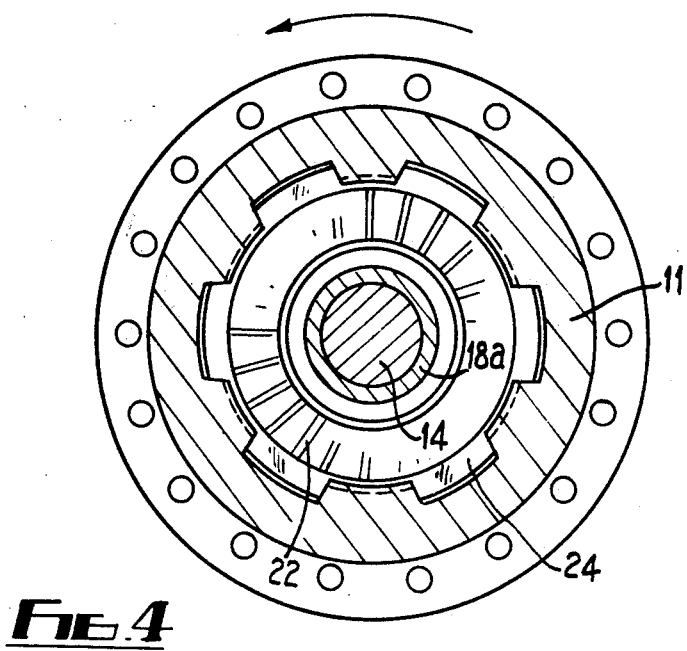
FIG. 4 is a section on line C—C of FIG. 1.

Referring now to the drawings, and particularly to FIGS. 1 to 4 thereof, a single speed, back-pedal disc-brake assembly as applied to a hub shell 11 comprises a plurality of annular brake discs 12 arranged in spaced, parallel disposition in respective transverse planes of the hub shell, the said discs 12 being dogged to the inner surface 11a of the shell for rotation therewith, a corresponding number of annular brake pads 13 mounted co-axially with the hub spindle 14 and non-rotatably mounted on a sleeve 15 arranged coaxially with the spindle 14, the pads being movable longitudinally of the sleeve, the said brake pads 13 being positioned for surface engagement with the annular brake discs 12. A clutch member 16 is movable axially of the hub shell under the control of co-operating screw-thread means 17 provided on such clutch member 16 and on an axial extension 18a to a driver 18 which carries a chain sprocket 19 and is drivable thereby. Coupling means 20, 21 in the form of teeth or dogs are provided at the opposite ends of the clutch member for selective co-operation with respective complementary means 22, 23 in the form of teeth or dogs on a drive transmission plate 24 secured to the shell or an axially shiftable pressure plate 25 non-rotatably mounted on the sleeve 15, according to the axial position of the clutch member 16.

The clutch member 16 has a coarse Acme thread at the bore thereof, for co-operation with a complementary thread at the outer surface of the extension 18a to the driver, relative rotation between such driver 18 and clutch member 16 giving rise to a shift of such member axially of the hub and in a direction determined by the sense of the relative rotation. The coupling means 21, 20 respectively provided at the opposite annular end faces of the clutch member comprise radial teeth or dogs for engagement with similar formations at the adjacent annular end faces of the shiftable pressure plate 25 and the drive transmission plate 24. In the case of coupling means 21 the teeth or dogs are defined by symmetrical V-shaped notches formed in the face of the clutch member, whilst the teeth or dogs in the opposite end face of the member and the adjacent face of the drive transmission on plate have an abutment surface which lies in a plane extending radially and axially of the hub.

A drag spring 26 is provided, the said spring being lapped about the hub spindle 14 and having a tail 26a which extends into a recess at the inner cylindrical face of a blind bore provided at the brake disc end of the clutch member 16, the drag spring acting to disengage the clutch member from the drive transmission plate on free wheeling.

In operation, with the application of a forward drive to the drive 18 from the sprocket 19, the clutch member 16 is moved to the right (FIG. 1) so that the coupling means 20 moves into engagement with the serrations 22 on the drive transmission member 24, the hub shell 11 thus being rotated by such member.

On the application of a reverse motion to the driver 18, as by back pedalling, the clutch member 16 moves axially of the driver extension under the combined influence of the drag spring 26 and the Acme thread, and coupling means 20 disengage from the teeth 22 on the drive transmission member and the coupling means 21 at the other end of the clutch member engage the teeth 23 on the pressure plate 25, continued backward motion of the driver resulting in the application of pressure to the plate and causing the same to slide axially to frictionally grip the brake discs 12 between the brake pads 13, the discs and pads being slidable relative to the hub shell and sleeve respectively and there being a reaction member fixed in position upon and axially of the sleeve. Upon a subsequent forward motion of the driver the clutch member is again moved towards the drive transmission plate, and the braking effect removed.

In a second, and preferred embodiment, see now Figures in which like reference numerals to those of FIGS. 1 to 4 are used for the same or equivalent parts a back-pedal hub-brake assembly comprises a hub shell 11 rotatably mounted upon a hub spindle 14 and coaxially therewith, a driver 18 intermediate the shell and spindle, the driver 18 having a chain sprocket 19 secured thereto, a clutch member 16 axially shiftable along an extension 18a to the driver, and an expandible, sleeve-like brake shoe 27 non-rotatably fixed to a bearing bush 28 mounted on the spindle at that end thereof remote from the driver 18, the clutch member 16 being adapted, according to its position axially of the extension 18a, to transmit a drive motion from the driver 18 to the shell 11 or to effect expansion of the brake-shoe 27 into engagement with the inner surface of the hub shell 11 against the restraint of a return spring 30.

The extension 18a to the driver has a coarse thread, (not shown), at the outer periphery thereof, such thread being in engagement with a complementary coarse thread, (not shown), at the bore of the clutch member 16, the arrangement being such that with relative rotation between the clutch member 16 and the driver 18 in one direction, the clutch member 16 moves axially of the extension in a first direction, whilst with relative rotation in the other direction, the clutch member moves axially in the opposite direction on the extension.

The clutch member 16 is provided with teeth 20 or the like at one annular end face thereof, such teeth being cooperable with complementary formations 22 on an annular face of a radially inwardly directed rib 24 formed integrally with the hub shell 11, the member 16 also including a conical camming surface 21 co-operable with a complementarily shaped internal end region 27a of brake show, movement of the clutch member 16 in one direction axially of the hub effecting engagement of the serrations and cooperating formations 20, 22 on the clutch member 16 and rib 24 respectively to transmit a forward drive to the shell, whilst movement of the clutch member 16 in the other direction shifts the camming surface 21 into contact with the said end region 27a to expand the brake shoe 27 into friction contact with the shell 11. A drag spring 29 is provided for promoting disengagement of the clutch member 16 from the hub-shell 11 on "free-wheeling". In addition, abutments 16' and 18' are respectively provided upon members 16 and 18 in order to permit formations 20 and 22 to become engaged, yet limit the axial movement of member 16 so as not to axially load rib 24 and shell 11, and therefore, not axially load the ball bearing members.

The operation of the hub illustrated in FIG. 5 is generally analogous to that of the hub of FIGS. 1 to 4 and further detailed description is not thought to be necessary, it being understood that whereas in the one case a collection of brake discs rotatable with the hub shell is moved axially into friction contact with non-rotatable brake pads mounted on the spindle, in the other case a brake shoe is expanded into contact with the inner surface of the hub shell.

What I claim is:

1. A back-pedal brake hub for a cicycle or the like comprising a spindle, a shell mounted on ball bearings in ball races for rotation about said spindle, sprocket-and-driver means mounted at one end of said hub and supported for rotation by ball bearings in a ball race disposed between said sprocket-and-driver means and said spindle, the driver portion of said means having a screw-threaded portion extending axially within said shell, brake means within said shell and comprising cooperating sections with one section being non-rotatably connected with said spindle and another section being connected with said shell, clutch means mounted on said screw-threaded portion of said driver portion for longitudinal movement relative thereto in one axial direction or the other responsive to the direction of rotation of said driver portion, first abutment means fixed to said clutch means, means on said one section of said brake means and one end of said clutch means for urging said cooperating sections of said brake means together without axial loading of said ball races supporting said shell upon axial movement of said clutch means in a direction corresponding with a back-pedalling operation of the sprocket portion of said sprocket-and-driver means to effect braking of said shell relative to said spindle, said clutch member having ratchet-shaped teeth at the other end thereof, complementary ratchet-shaped teeth being provided on a drive transmission rib integrally connected with said shell, both sets of teeth having one side disposed radially of said spindle in a plane disposed axially of said spindle and the other side disposed at an acute angle thereto, said teeth being adapted to have their said one side brought into engagement upon axial movement of said clutch means in a direction corresponding to a forward operation of said sprocket portion, and a second abutment means carried by said sprocket-and-driver means for engaging said first abutment means so as to prevent said clutch member from imparting an axial load to said ball races supporting said shell when said teeth are engaged.

* * * * *